United States Patent
Moreau

(10) Patent No.: US 6,394,464 B1
(45) Date of Patent: May 28, 2002

(54) SEALED PASSAGE DEVICE

(75) Inventor: Jean-Luc Moreau, Chateaudun (FR)

(73) Assignee: Connecteurs Electriques Deutsch, Evreux (FR)

(*) Notice: Subject to any disclaimer, the term of this patent is extended or adjusted under 35 U.S.C. 154(b) by 0 days.

(21) Appl. No.: 09/517,337

(22) Filed: Mar. 2, 2000

(30) Foreign Application Priority Data

Mar. 2, 1999 (FR) .............................................. 99 02552

(51) Int. Cl.$^7$ .............................. F16L 21/05; H02G 3/18
(52) U.S. Cl. ........................ 277/603; 277/623; 277/609; 277/622; 277/627; 174/65 SS; 285/154.3; 285/323; 285/343; 403/312; 403/371
(58) Field of Search ................................. 277/314, 316, 277/603, 609, 616, 622, 627, 623, 624; 174/77 R, 93, 21 R, 65 G, 65 R, 65 SS, 845; 385/136; 285/343, 323, 324, 154.2, 154.3; 403/337, 308, 309, 312, 313, 371, 374.4, 401.1

(56) References Cited

U.S. PATENT DOCUMENTS

| | | | |
|---|---|---|---|
| 1,323,655 A | * 12/1919 | Strandell | |
| 1,714,590 A | * 5/1929 | Dake | |
| 1,983,840 A | * 12/1934 | Dohner | |
| 4,083,587 A | * 4/1978 | Leczycki | 285/343 |
| 4,323,727 A | * 4/1982 | Berg | 174/135 |
| 4,371,172 A | * 2/1983 | de Vienne | |
| 4,376,873 A | * 3/1983 | Lackinger | 174/65 SS |
| 4,387,267 A | * 6/1983 | Becker | 174/65 SS |
| 4,580,788 A | * 4/1986 | Rabe et al. | |
| 4,629,825 A | * 12/1986 | Lackinger | 174/65 SS |
| 4,641,905 A | * 2/1987 | Poliak et al. | 339/103 B |
| 4,692,563 A | * 9/1987 | Lackinger | 174/65 SS |
| 4,787,657 A | * 11/1988 | Henniger | 285/323 |
| 5,018,768 A | * 5/1991 | Palatchy | 285/24 |
| 5,051,541 A | * 9/1991 | Bawa et al. | 174/65 SS |
| 5,336,850 A | * 8/1994 | Mitsch | 174/65 SS |
| 5,350,204 A | * 9/1994 | Henniger | 285/323 |
| 5,405,172 A | * 4/1995 | Mullen, Jr. | 285/92 |
| 5,543,582 A | * 8/1996 | Stark et al. | 174/65 SS |
| 5,594,202 A | * 1/1997 | Tobias | 174/48 |
| 5,644,673 A | * 7/1997 | Patterson | 385/138 |
| 5,773,759 A | * 6/1998 | Hablutzel | 174/65 R |
| 5,866,853 A | * 2/1999 | Sheehan | 174/65 SS |
| 5,927,892 A | * 7/1999 | Teh-Tsung | 403/259 |

FOREIGN PATENT DOCUMENTS

| | | |
|---|---|---|
| DE | 43 00 521 | 7/1994 |
| DE | 297 15 811 | 12/1997 |
| FR | 2 694 655 | 2/1994 |

* cited by examiner

Primary Examiner—Anthony Knight
Assistant Examiner—Alison K. Pickard
(74) Attorney, Agent, or Firm—Young & Thompson

(57) ABSTRACT

A sealing device for installation between a partition and at least one cable or conduit passing through a hole in the partition, includes two half-shells together forming a cylindrical body which completely surrounds the cable or conduit and is fixed to the partition. The device also includes a sealing joint and sealant to fill the space between the cable or conduit and the cylindrical body and to immobilize them relative to each other. The sealing means includes at least one sealing gasket of a flowable elastomeric material disposed about the cable or conduit, a radial gripping device in the form of a resiliently deformable split ring, which is disposed about the sealing gasket in the cylindrical body. The sealing gasket includes a skirt which is radially retractable in a substantially uniform manner about its entire circumference. The sealant also includes an axial gripping device which interacts with the cylindrical body and the skirt so that the skirt retracts so as to compress and cause the sealing gasket to flow and fill the space between the cable or conduit and the cylindrical body.

22 Claims, 8 Drawing Sheets

SEALED PASSAGE DEVICE

BACKGROUND OF THE INVENTION

The present invention relates generally to a sealing device to establish a seal between a partition and at least one cable or a conduit passing through a hole in said partition. The invention more particularly concerns a sealing device of the type comprising two half-shells adapted to be placed on the cable or conduit and assembled with each other to form together a cylindrical body which completely surrounds said cable or conduit and can be secured to said partition through the hole in the latter, a sealing joint adapted to be disposed between the cylindrical body and said partition, and sealing means to fill the space between said cable or conduit and said cylindrical body and to immobilize these relative to each other.

There is already known a sealing device of the type described above, adapted to establish a seal between a partition and a bundle of cables passing through a hole in said partition. In service, to establish a seal with said known sealing device, the two half-shells are placed about the bundle of cables and secured to each other by adhesive strips. Then, two conical cups, slotted longitudinally on one side and made of a flexible material, are disposed about the bundle, each on one side of the cylindrical body formed by the two half-shells, so as to cover the open ends. Once emplaced, each conical cap is maintained closed and assembled to the cylindrical body also by the adhesive strip. There is thus obtained a "mold" into which can be injected a filling product which polymerizes at ambient temperature and which serves as the sealing means to fill the space between the bundle of cables and the cylindrical body. At least one injection opening is provided in at least one of the half-shells of the cylindrical body for the injection of the filling product. After polymerization and drying, the two conical cups are removed.

This known sealing device has a certain number of drawbacks. The quality of the sealing obtained is haphazard. It thus depends largely on the care with which the "mold" is filled and on the quality of the filling product to fill the spaces between the various cables of the bundle of cables. Moreover, the preparation time of the sealing device is relatively long, particularly because of the time necessary for polymerization of the filling product. Still further, the filling product is generally toxic and requires precautions during its use. Finally, the sealing device cannot be repaired in case of a leak.

The present invention therefore has for its object to provide a sealing device of the type indicated above, whose preparation will be easier and more rapid than that of the known sealing device, whilst obtaining a good seal, without the use of a toxic filling product, and which permits repairs if needed.

SUMMARY OF THE INVENTION

To this end, the sealing device according to the invention is characterized in that the sealing means comprise:

a) at least one sealing gasket of an elastomeric material capable of flowing, and adapted to be disposed about said cable or conduit;

b) a radial gripping device, in the form of a resiliently deformable split ring, which is so dimensioned as to be able to fit about said sealing gasket and to engage in said cylindrical body, and which comprises a skirt structured or configured to be radially retractable at least substantially uniformly about its entire circumference under the action of an axial gripping force; and c) an axial gripping device which interacts with said cylindrical body and said skirt to require the latter to retract so as to compress and cause said sealing gasket to flow to fill said space between the cable or conduit, and the cylindrical body.

Preferably, the sealing device according to the invention can also have the following characteristics:

the radially retractable skirt of the radial gripping device is defined by a circular series of flexible fingers, which are formed from a single piece with said split ring and extend from a surface of the latter in a direction substantially parallel to the axis of said split ring;

the flexible fingers have their lateral surfaces, two by two facing each other, which are inclined so as to overlap in the circumferential direction of the split ring;

the cylindrical body is provided with a screwthread at one of its ends and, in a region located at a distance from said screwthread, an annular internal shoulder serving as an axial bearing for the split ring of said radial gripping device;

the axial gripping device comprises at least two pieces assemblable together, which define, after their assembly, a conical surface and a screwthreaded element adapted to coact with the screwthread of said cylindrical body to press axially said conical surface against the free ends of the flexible fingers of said radial gripping device, so as to require said free ends of the flexible fingers to retract radially;

the screwthread of said cylindrical body is a female thread and said axial gripping device comprises three pieces, namely a split collar of resiliently deformable material, which can slide axially in said cylindrical body and whose central hole has, as a cylindrical surface, a conical bevel turned toward the flexible fingers of said radial gripping device, and two half-nuts assembled together to form together an externally screwthreaded sleeve-nut, which surrounds said cable or conduit, is screwed in the female screwthread of said cylindrical body and presses axially said split collar and its conical bevel against the free ends of the flexible fingers of said radial gripping device to make them retract radially;

the split collar comprises, in its region diametrically opposed to its slot, a groove which is parallel to said slot and which defines in said region a zone of lesser wall thickness facilitating resilient deformation of said split collar for its emplacement about said cable or conduit;

the two half-nuts are assembled to each other by surfaces that are mutually in contact, which have respectively male and female positioning elements receivable in each other and clip retaining means;

said sleeve-nut comprises on its peripheral surface a mark which is indicative of insufficient gripping of said sleeve-nut when the latter is screwed into the female screwthread of said cylindrical body and said mark is still visible;

the mark is constituted by a colored ring which has a color different from that of the rest of the sleeve-nut;

the sleeve-nut and the cylindrical body comprise, by way of anti-unscrewing means, at least one protuberance and at least one recess which engage in each other when said sleeve-nut has reached a predefined degree of screwing;

the cylindrical body and the split ring of the radial gripping device comprise at least one protuberance and at least one recess engaging in each other as an anti-rotation device;

the two half-shells forming said cylindrical body are assembled to each other by mutually contacting surfaces which have male and female positioning elements, and are maintained assembled with each other by bolt-nut assemblies;

the bolts and the nuts of the bolt-nut assemblies are disposed in recesses respectively provided in the two half-shells and are maintained there by retaining elements which are formed in said recesses, of a single piece with said half-shells;

as the sealing gasket, there is provided a sleeve of elastomeric material which is longitudinally slotted and which covers the internal surface of the split ring of said radial gripping device, including its flexible fingers, said elastomeric sleeve comprising, at one of its ends, a small collar which covers the surface of said split ring oriented toward the annular internal shoulder of said cylindrical body and an adjacent portion of the external peripheral surface of said split ring;

as a sealing gasket, there is provided in addition to said sleeve of elastomeric material, at least one pair of strips of elastomeric material which are disposed as a sandwich and pressed on each side of a layer comprised by at least one portion of said cables forming said bundle.

in the case of a single layer formed by all the cables of said bundle, the sandwich composed of said layer and the two strips of elastic material is rolled up on itself so as to form a roll whose axis is parallel to the longitudinal axis of the cables, and an additional strip of elastic material is wound in at least one turn about said roll;

in the case of several layers each formed by a certain number of cables of the bundle and each gripped in sandwich fashion between a respective pair of strips of elastomeric material, said layers covered by their strips of elastomeric material are superposed on each other, and an additional strip of elastic material is wound in at least one turn about the assembly formed by the superposed layers;

each of the two half-shells forming said cylindrical body is provided with a half-flange which, after assembly of the two half-shells, forms with the half-flange of the other half-shell a flange for the securement of said cylindrical body to said partition;

the two half-flanges and the annular shoulder of said cylindrical body are co-planar;

the sealing joint is constituted by two half-joints of elastomeric material each associated with the half-flange of a corresponding half-shell, each half-joint comprising a substantially flat portion, in the form of an arc, which is adapted to be applied against the surface, on the partition side, of the half-flange of the corresponding half-shell, and two portions located respectively at the base of the portion in the shape of an arch and adapted to be interfitted between the two half-flanges and between the corresponding portions of the half-shells forming together said annular shoulder of the cylindrical body;

a substantially flat portion of each half-joint is fixed to the half-flange of the corresponding half-shell by bolting;

at least one of the two half-shells of said cylindrical body comprises, over the thickness of its wall, at least one longitudinal channel, of which one of the ends opens to the exterior of said cylindrical body on the side of its screwthreaded end and is closed in a sealed manner by a cable grommet of elastomeric material, and whose other end opens into the internal space of said cylindrical body beyond its annular shoulder;

the body is at least superficially electrically conductive and has, at each of its ends, a circular throat for the securement of one end of a metallic braid for armoring the cable or a bundle of cables with the help of a gripping collar.

BRIEF DESCRIPTION OF THE DRAWINGS

Other characteristics of the present invention will become apparent from the following description of one embodiment of the invention given by way of example, with reference to the accompanying drawings, in which.

DETAILED DESCRIPTION OF THE PREFERRED EMBODIMENTS

Figure 1:
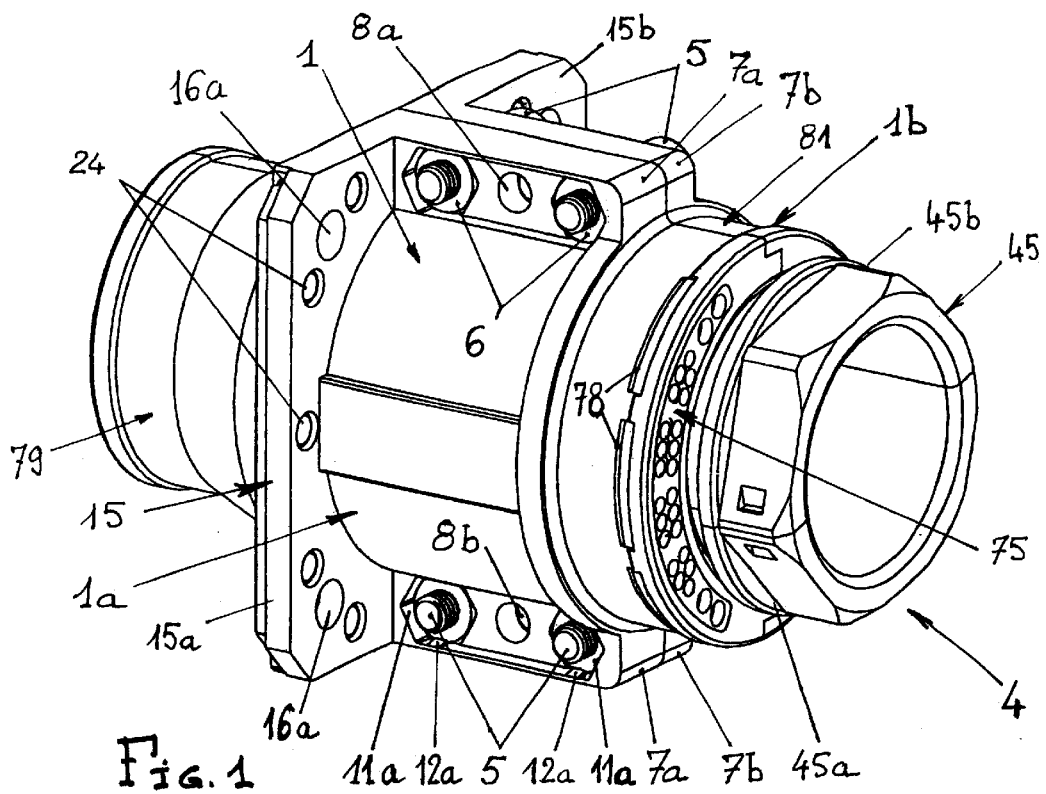
FIG. 1 is a perspective view of the sealing device according to the invention from a three-quarter front view.
Figure 2:
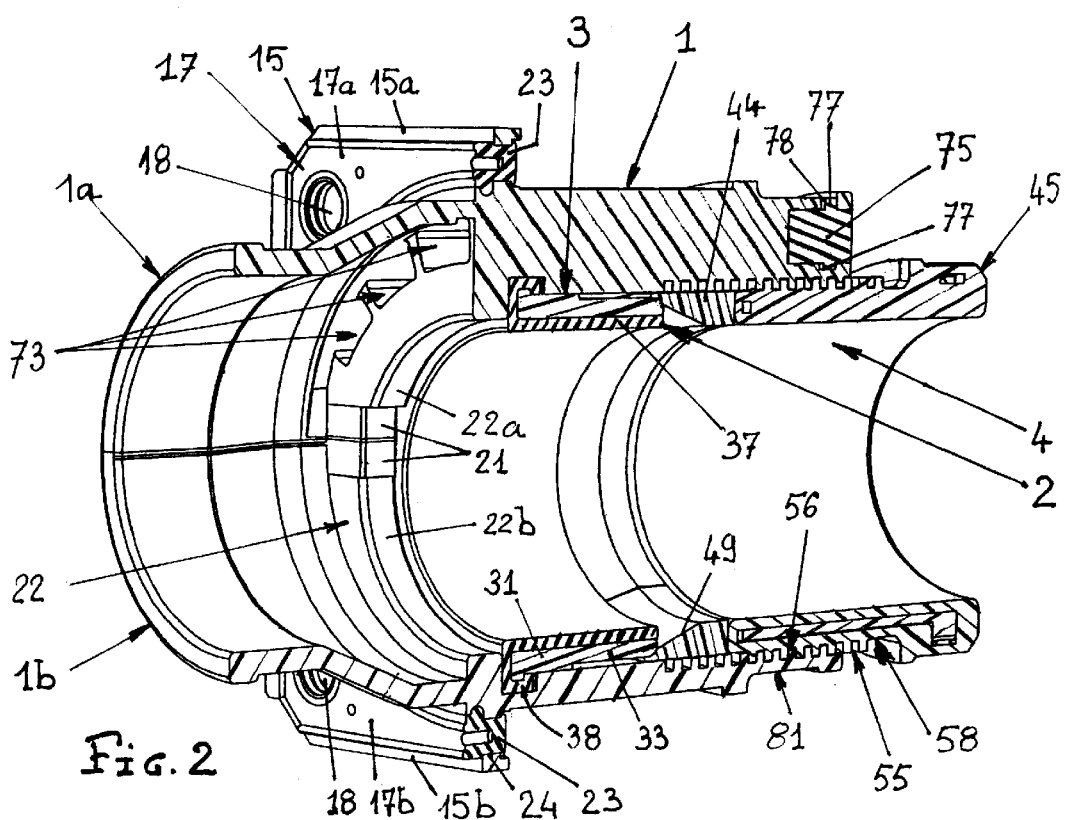
FIG. 2 is a perspective view of the sealing device seen in three-quarter rear view and in cross-section on an axial plane perpendicular to the plane of the joint of the two half-shells of the cylindrical body of the sealing device.

The sealing device shown in FIG. 1 comprises essentially a body 1, of overall cylindrical shape, comprised by two half-shells 1a and 1b, at least one sealing gasket 2 (not shown in FIG. 1, but visible in FIGS. 2, 3 and 10), a radial gripping device 3 (also not shown in FIG. 1, but visible in FIGS. 2, 3 and 9) and an axial gripping device 4 (only partly visible in FIG. 1 and completely visible in FIG. 2).

Figure 3:
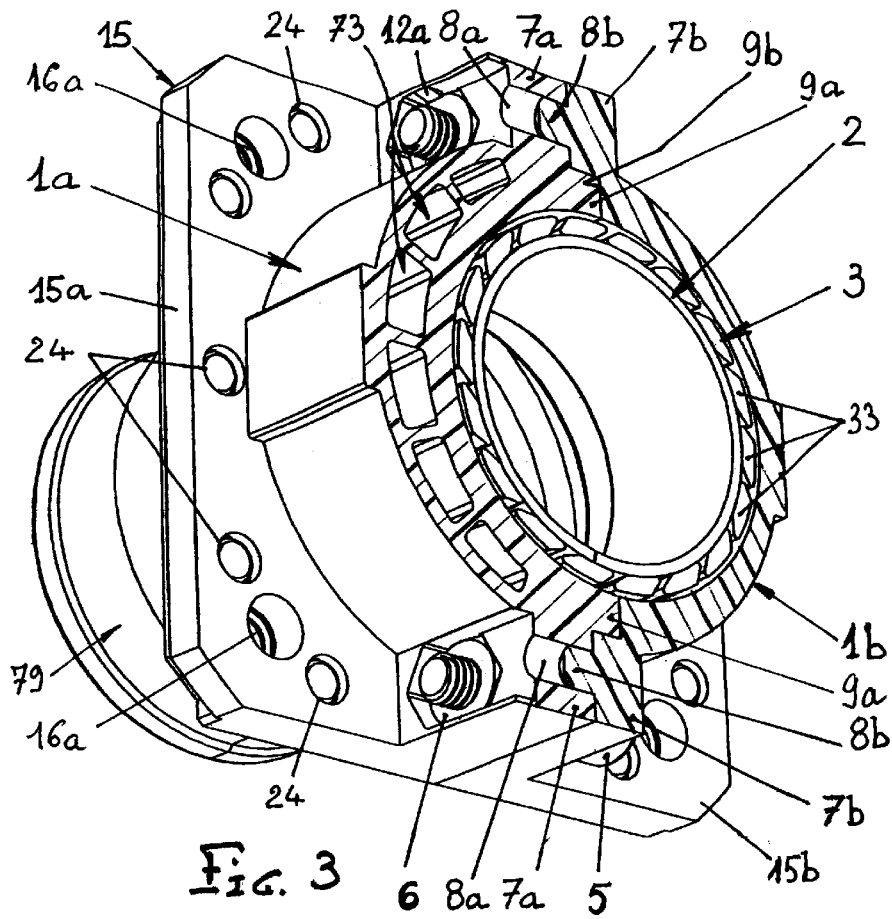
FIG. 3 is a perspective view of the sealing device seen in a direction slightly different from that of FIG. 1 and in cross-section on a plane perpendicular to the axis of the cylindrical body of the sealing device.

The two half-shells 1a and 1b have mutually contacting surfaces which have male and female elements which fit within each other and they are maintained assembled with each other by several bolt 5 and nut 6 assemblies, for example, four bolt-nut assemblies as shown in FIGS. 1 and 3. More precisely, each of the two half-shells 1a, 1b comprises two assembly flanges 7a, 7b which extend along their longitudinal edges, over a portion of the length of the latter, in a medial region of the cylindrical body 1. Each of the two assembly flanges 7b of the half-shell 1b has, on its surface facing the corresponding flange 7a of the other half-shell 1a, a positioning pin 8b (FIG. 5) which can be received with light friction in a smooth holes 8a (FIGS. 3 and 4) of the corresponding flange 7a. So as further to improve the positioning of the two half-shells 1a and 1b, relative to each other, the half-shells 1 has on each of its two longitudinal edges a longitudinal rib 9a which, when the two half-shells 1a and 1b are assembled, engages in a longitudinal groove 9b provided in each of the two longitudinal edges of the half-shell 1b.

As shown in FIGS. 1 and 3, each of the two flanges 7a of the half-shell 1a has, in its external surface (which is farthest from the corresponding flange 7b), a shallow recess of elongated shape, in the body of which are formed two deeper recesses 11a of hexagonal shape, adapted each to receive, practically without play, the nut 6 of one of the above-mentioned bolt-nut assemblies. Thus, the nuts 6 cannot turn in their respective recesses 11a when the bolts 5 are screwed in. So as to prevent loss of the nuts 6, each nut 6 is maintained in its respective recess 11a by a retaining element 12a which is formed from a single piece with the half-shell 1a. Preferably, retaining element 12a is present in the form of a ramp or a sawtooth and is formed on a thin resiliently deformable wall of the above-mentioned shallow recess. The bottom of each recess 11a is pierced with a hole 13a (FIG. 4) which is aligned with a corresponding hole 13b of one of the two flanges 7b, each of the two flanges 7b comprising thus two holes 13b. Each pair of aligned holes 13a and 13b receives the screwthreaded shank of the bolt 5 of one of the above-mentioned bolt-nut assemblies. So as to guard against loss of the bolts 5, the half-shell 1b can preferably comprise, in each hole 13b, several fingers, for example four fingers 14b (FIG. 5) which are formed of a single piece with said half-shell 1b, are resiliently deformable and engage in a throat (not shown) of the bolt 5 engaged in the corresponding hole 13b.

The two half-shells 1a and 1b forming the cylindrical body 1 are moreover provided with respective half-flanges 15a and 15b which, after assembly of the two half-shells, together form a flange 15 permitting the securement of the cylindrical body to a partition (not shown) pierced with a hole through which it is desired to cause to pass, in a sealed manner, a cable, a conduit, a bundle of cables or a bundle of conduits (not shown in FIGS. 1 to 6). Each half-flange 15a, 15b comprises two screw-holes 16a or 16b for securement screws or suitable bolts serving for the securement of the sealing device according to the invention on said partition. The surface of this securement flange 15 which is oriented toward the partition carries a sealing joint 17 (FIG. 2). The sealing joint 17 comprises holes 18 corresponding with the holes 16a, 16b of the half-flanges 15a, 15b.

Figure 7:
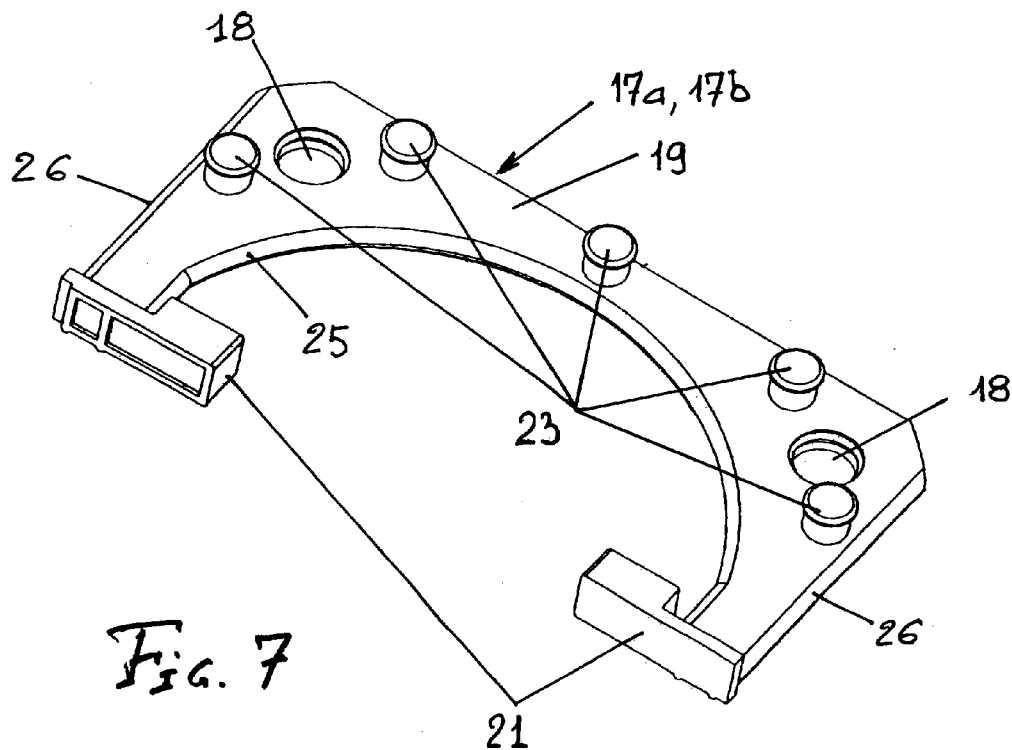
FIG. 7 is a perspective view of one of the two portions of a sealing joint in two parts, adapted to be used with the sealing device according to the invention.

In reality, this sealing joint 17 is constituted by two half-joints 17a and 17b, of an elastomeric material, each associated with the half-flange 15a or 15b of the corresponding half-shell 1a or 1b. The two half-joints 17a and 17b are identical and have a structure such as the one that is shown in FIG. 7. More precisely, each half-joint 17a, 17b comprises a substantially flat portion 19 in the form of an arch, which is adapted to be applied against the partition side surface of the half-flange 15a or 15b, and two portions 21, which are located respectively at the feet of said portion 19 in the form of an arch. During assembly of the two half-shells, the portions 21 interfit between the two half-flanges 15a and 15b and between the corresponding portions 22a and 22b of the half-shells 1a and 1b, forming together a shoulder or annular collar 22 (FIG. 2) which projects radially inwardly of the cylindrical body 1 comprised by the two half-shells. The securement flange 15 and the shoulder or annular collar 22 are located in a same plane perpendicular to the axis of the cylindrical body 1. Each of the two half-joints 17a, 17b can be secured to the corresponding half-flange 15a, 15b by bolting. To this end, the portion 19 of each half-joint carries, on its surface oriented toward the corresponding half-flange, several bolts, for example several projections, for example five projections 23 as shown in FIG. 7. The projections 23 are formed of a single piece with the half-joint and, in service, are engaged in step within corresponding holes 24 of the associated half-flange 15a or 15b. Moreover, the arched edge 25 and the lateral straight edges 26 of the portion 19 of each half-joint 17a, 17b are engaged and held respectively in a semicircular throat 27 and straight throats 28 (FIGS. 4 and 5) formed in the half-shells 1a and 1b and their half-flanges 15a, 15b. To guarantee accurate position of the portions 21 of each half-joint relative to the corresponding portions 21 of the other half-joint, and to apply securely said portions 21 two by two against each other, each portion 21 has a recess (not shown in FIG. 7) in which is engaged and pressed a projection 29 formed of a single piece with the half-shell 1a or 1b at each end of the annular half-collar 22a or 22b.

Figure 9:
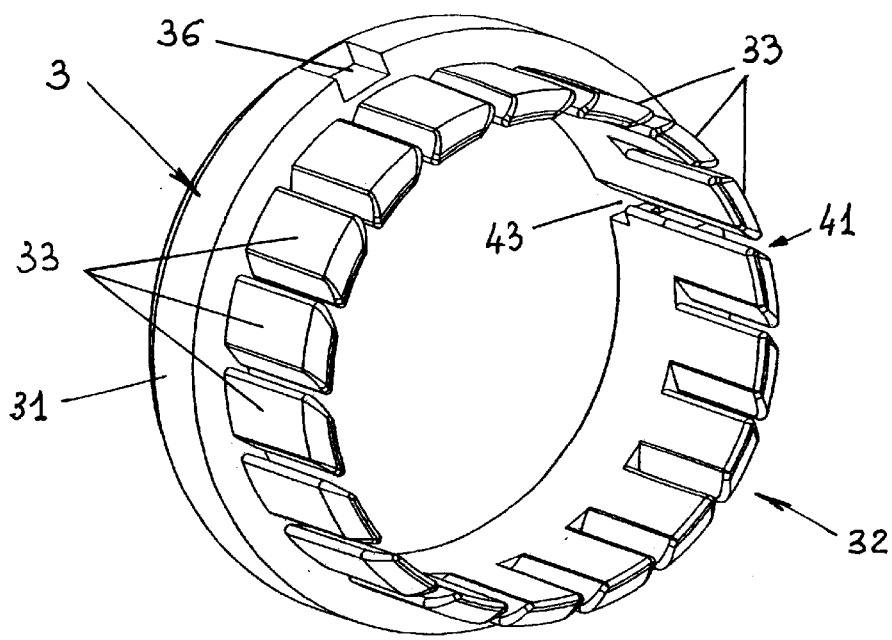
FIG. 9 is a perspective view of a radial gripping device, which forms a portion of the sealing device according to the invention.
Figure 10:
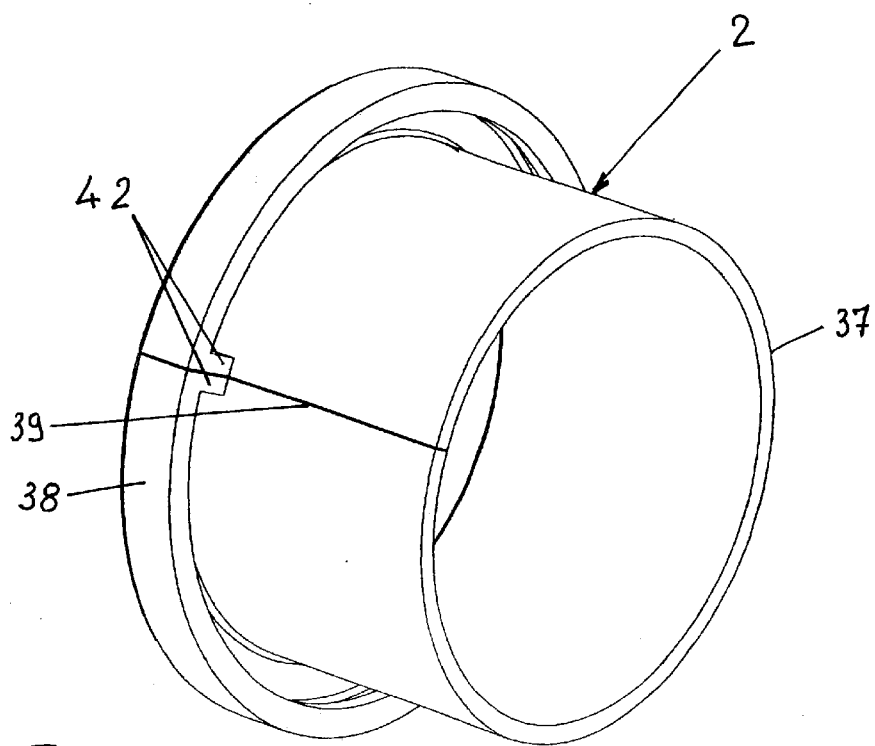
FIG. 10 is a perspective view of a sealing gasket usable with the radial gripping device of FIG. 9.

The radial gripping device 3, which is shown in detail in FIG. 9, is essentially constituted by a split ring 31 molded of a semi-rigid plastic material so as to be resiliently deformable, such that the ring 31 may be opened by resilient deformation emplaced about a cable, a conduit, a bundle of cables or conduits on which the sealing device is to be installed. On one side, the split ring 31 is provided with a skirt 32 which can be radially retracted in a substantially uniform fashion over all its circumference under the influence of an axial gripping force arising from the axial gripping device 4 mentioned above. As shown in FIG. 9, the skirt 32 can be defined by a circular series of flexible fingers 33 which are formed as a single piece with the split ring 31 and extend from a surface of the latter in a direction substantially parallel to the axis of said ring. Preferably, the flexible fingers 33 have lateral surfaces, facing each other two by two, which are inclined so as to overlap in circumferential direction as is shown in FIGS. 3 and 9. Such an arrangement permits ensuring that the radial pressure exerted by the fingers 33 on the sealing gasket 2 under the action of the axial gripping device 4, will be quite uniform over all the circumference of the skirt 32.

The two half-shells 1a and 1b comprise, immediately adjacent their portions 22a and 22b forming the collar or annular shoulder 22, a throat 34a or 34b (FIGS. 4 and 5) adapted to receive the split ring 31 of the radial gripping device 3 to position it axially within the cylindrical body 1. Moreover, at least one of the two half-shells 1a and 1b, preferably each of these two half-shells comprises, at the bottom of the throat 34a or 34b, or projection 35a or 35b adapted to engage in a corresponding recess 36 formed in the periphery of the split ring 31, so as to prevent this latter from turning when it is in place in the throats 34a and 34b of the two half-shells.

The sealing gasket 2 mentioned above is shown in detail in FIG. 10. It comprises a cylindrical sleeve 37, of a resilient material adapted to flow, which is longitudinally slotted and which, in service, covers the internal surface of the split ring 31, including the skirt 32 formed by the fingers 33. At one of its ends, the sleeve 37 is provided with a small collar 38 which, in service, covers the surface of the split ring 31 which is oriented toward the annular shoulder 22, as well as an adjacent portion of the external peripheral surface of the split ring 31, as shown in FIG. 2. So that the sealing gasket 2 and the radial gripping device 3 may be emplaced together about the cable, the conduit, the bundle of cables or of conduits on which the sealing device is to be installed, the sealing gasket 2 and the radial gripping device 3 are first assembled with each other such that the slot 39 of the sleeve 37 is located in correspondence with the slot 41 of the split ring 31 and of its skirt 32, which is to say that the slots 39 and 41 occupy the same angular position about the circumference of the sleeve 37 and the ring 31. To facilitate such an angular positioning of the two slots 39 and 41 relative to each other, the sleeve 37 and its small collar 38 comprise two radial tongues 42 (FIG. 10), which are located respectively on opposite sides of the slot 39 and which in service are engaged in a notch 43 formed in the split ring 31 in the region of its slot 41 (FIG. 9). Not only the two tongues 42 facilitate the angular positioning mentioned above, but they also improve the sealing in this region of the slot 39 when the split ring 31 closes under the action of the axial gripping device 4.

Figure 11:
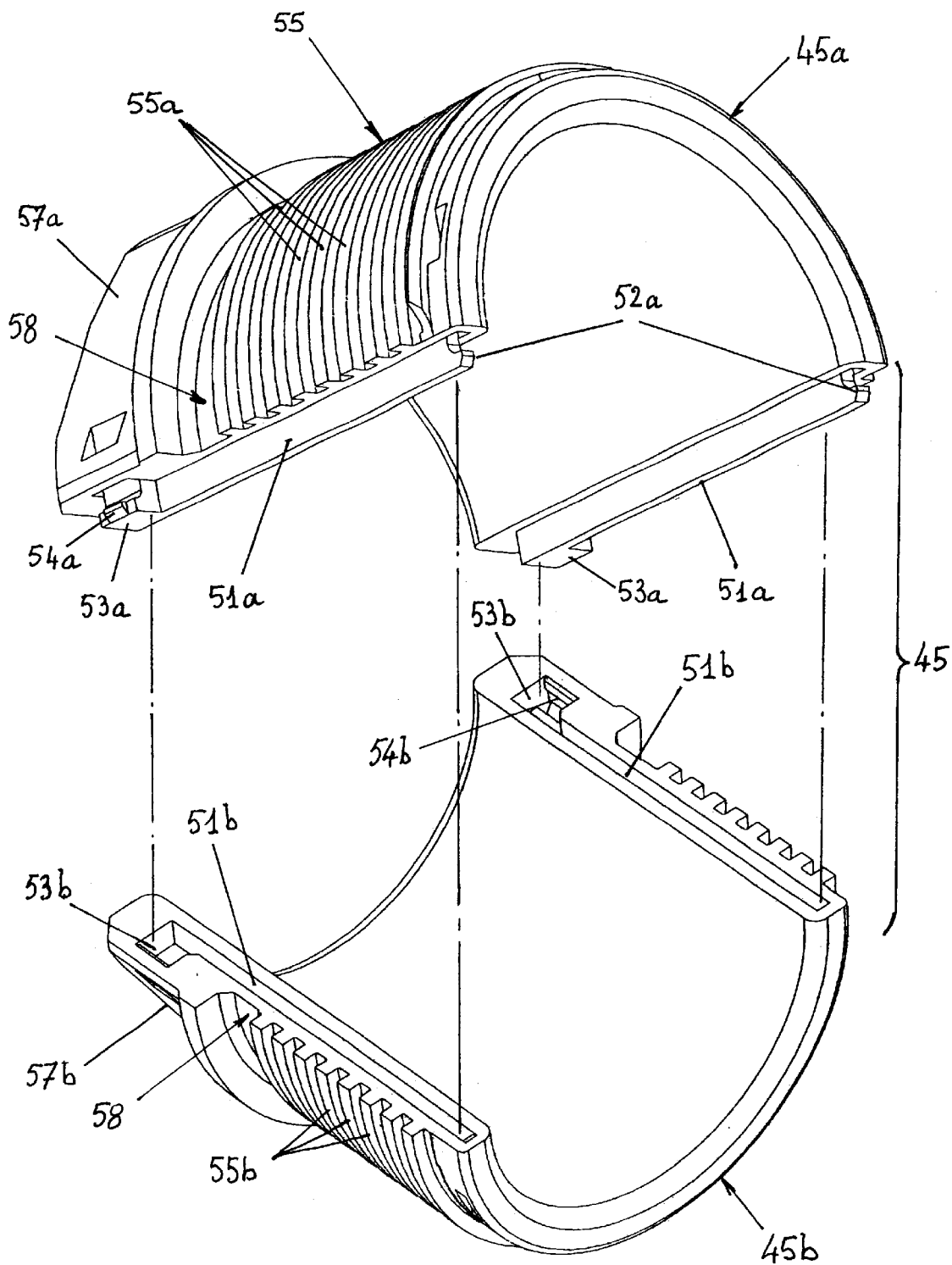
FIG. 11 is an exploded perspective view of a two-part bolt (half-nuts) usable as the axial gripping device in the sealing device according to the invention.
Figure 12:
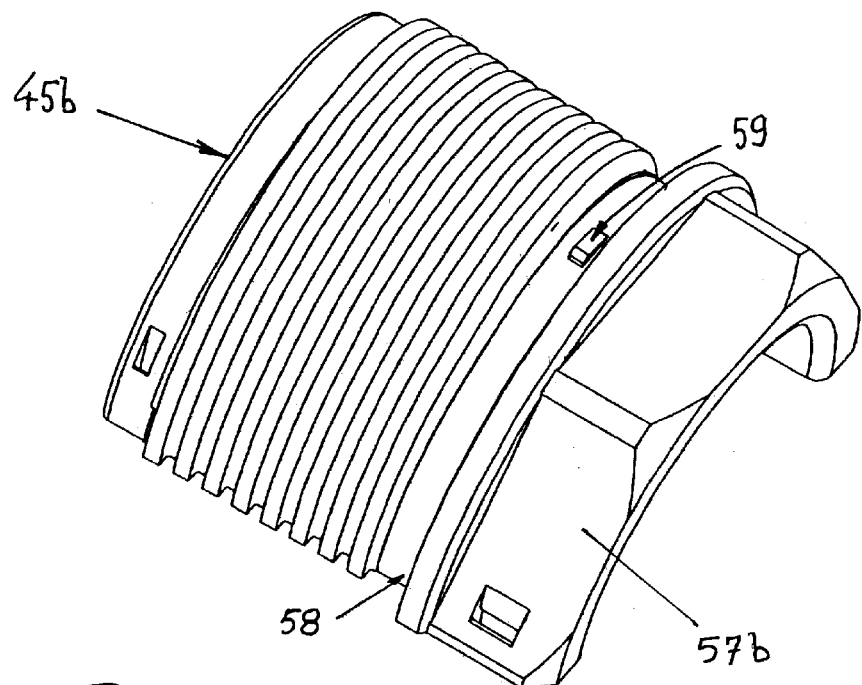
FIG. 12 is a perspective view showing, from another angle of view, one of the two half-nuts of FIG. 11.
Figure 13:
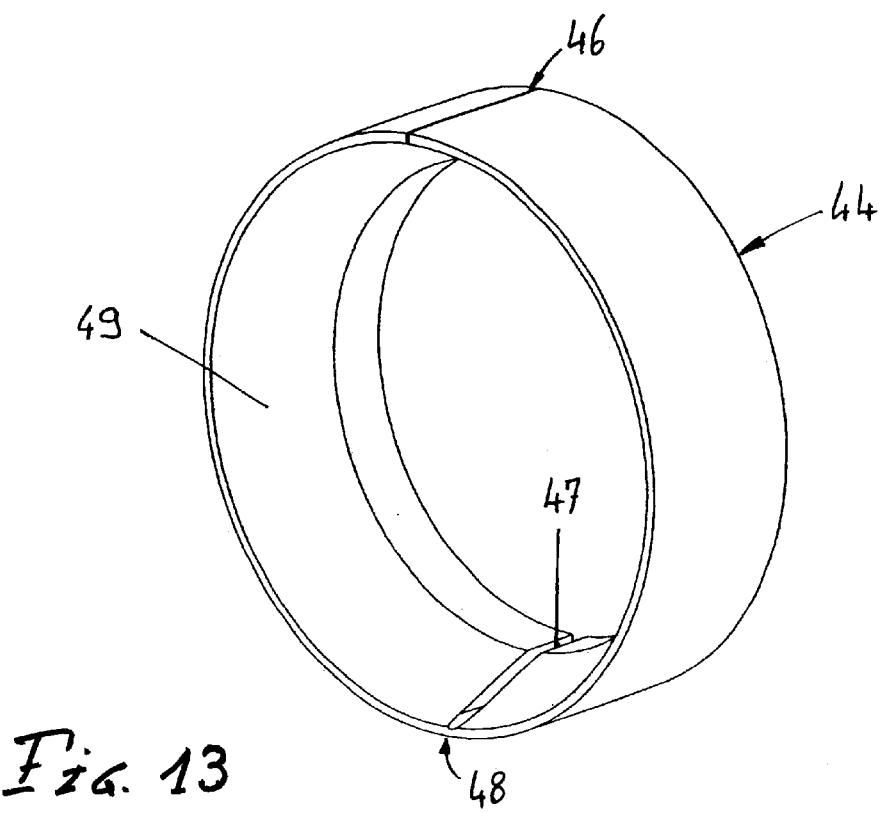
FIG. 13 is a perspective view of a split collar, constituting another element of the sealing device according to the invention.

As shown in FIG. 2, the axial gripping device 4 comprises preferably two elements, namely a split collar 44 (see also FIG. 13) and a sleeve-nut 45 (see also FIGS. 11 and 12).

The split collar 44 is made for example of a resiliently deformable plastic material, such that the collar can be opened by resilient deformation, so as to be able to disposed about a cable, a conduit, a bundle of cables or conduits on which the sealing device is adapted to be installed. So as to facilitate the opening movement of the collar 44, the latter has, in the region diametrically opposite its slot 46, an internal groove 47, which is parallel to the slot 46 and which defines a zone of lesser thickness 48, playing the role of a flexible hinge. The collar 44 has an external cylindrical surface whose diameter is selected such that the collar can slide axially within the cylindrical body 1. The central hole of the collar 44 has a cylindrical portion, whose diameter corresponds generally to the internal diameter of the sleeve 37 of the sealing gasket 2, and it has a conical bevel 49 at its end turned toward the free ends of the flexible fingers 33 of the radial gripping device 3.

To be able to be emplaced about the cable, conduit, bundle of cables or conduits on which the sealing device is to be installed, the sleeve-nut 45 of the axial gripping device 4 is itself comprised by two half-nuts 45a and 45b that can be assembled and secured to each other. As shown in FIG. 11, the two half-nuts 45a and 45b are assembled to each other by mutual contact surfaces, which have respectively ribs 51a and grooves 51b that fit within each other to position the two half-nuts relative to each other. The two half-nuts 45a and 45b can be maintained assembled with each other by grip retaining means. To this end, each of the two ribs 51a comprises, at one of its ends, a snap-in finger 52a which can hook behind a stop surface (not shown) formed in the corresponding groove 51b at one of the ends of the latter. At its other end, each rib 51a is enlarged in the form of a lug 53a of rectangular cross-section which can fit within a recess 53b of corresponding shape provided at the corresponding end of each groove 51b. Each lug 53a has, on one side, a snap projection 54a which can hook behind a stop surface 54b provided in the recess 53b.

Figure 4:
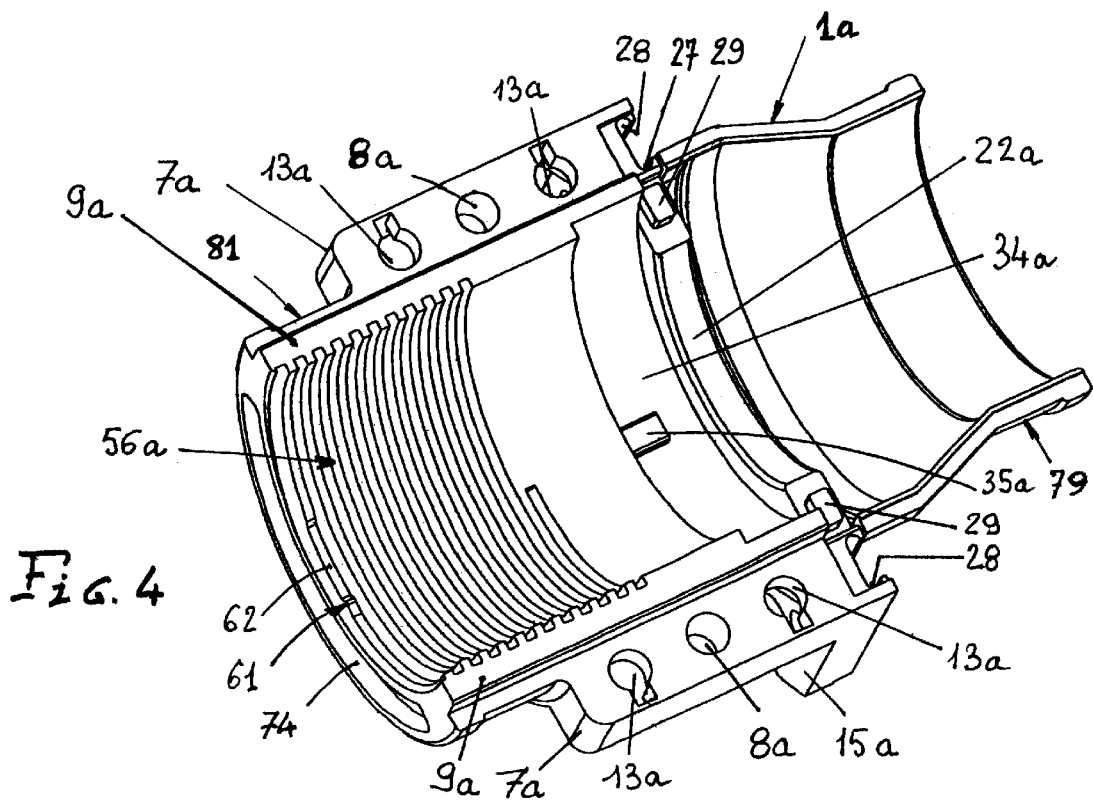
FIG. 4 is a perspective view of the interior of one of the half-shells of the cylindrical body of the sealing device.
Figure 5:
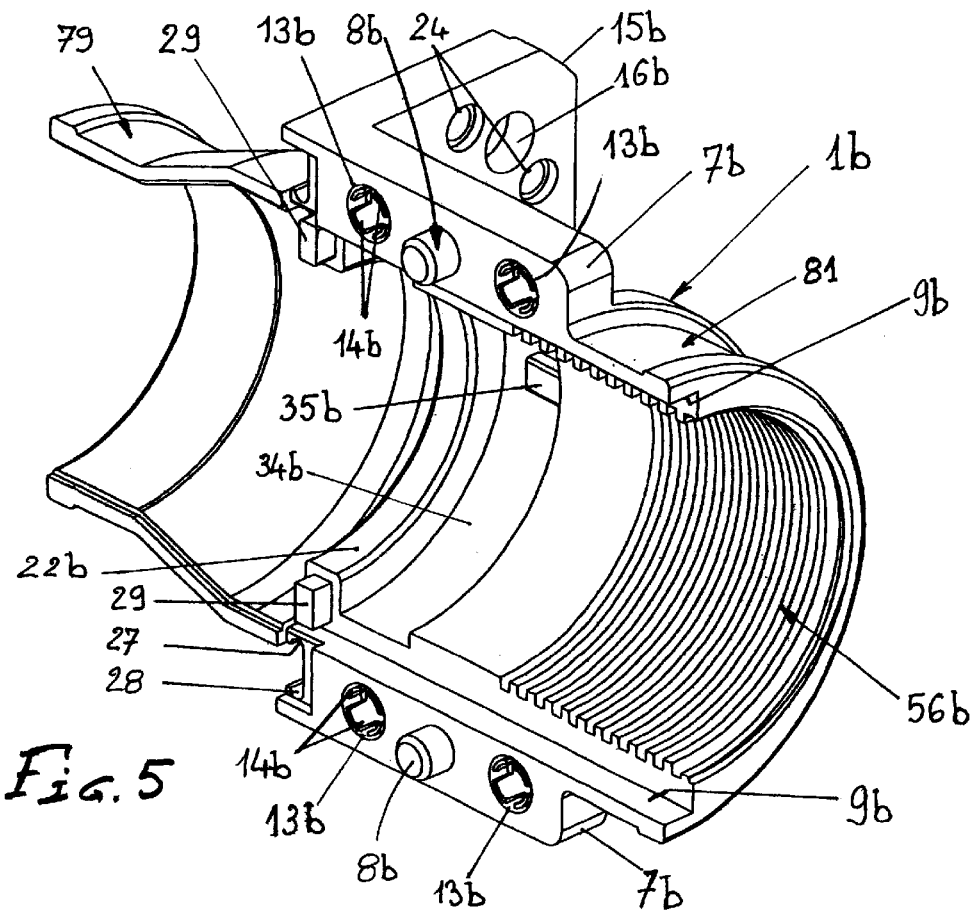
FIG. 5 is a perspective view of the interior of the other half-shell of said sealing device.

Each of the two half-nuts 45a and 45b has, on its external surface, screwthreads 55a and 55b which, after assembly of the two half-nuts, form a male screwthread 55 that can be screwed into a female screwthread 56 (FIGS. 2 and 6) which is formed in the cylindrical body 1 at one end of the latter, at a distance from the annular shoulder 22. The female screwthread 56 is constituted by screwthreads 56a and 56b formed respectively in the half-shells 1a and 1b, as shown in FIGS. 4 and 5.

At their outer end, which is to say the end which is farthest from the split collar 44, the two half-nuts 45a and 45b are provided respectively with collars 57a and 57b, each with three flat sides, which together form a hexagonal collar to which may be applied a suitable wrench for screwing or unscrewing the sleeve-nut 45 in the cylindrical body 1. Thus, by screwing the sleeve-nut 45 into the cylindrical body 1, said sleeve-nut presses axially against the split collar 44 which in turn acts, by its conical surface 49, on the free ends of the flexible fingers 33 so as to cause them to retract or radially contract to press the sealing gasket 2 about the cable, conduit, bundle of cables or conduits on which the sealing device is installed.

Preferably, the sleeve-nut 45 comprises, on its peripheral surface, a mark 58 adapted to indicate insufficient gripping of the sleeve-nut 45 when the latter is screwed into the female screwthread 56 of the cylindrical body 1 and that the mark 58 is still visible. This mark 58 can be constituted for example by a colored ring which has a color different from that of the rest of the sleeve-nut 45. The mark 58 can be formed by paint having a suitable color, preferably red so as to draw the attention of the user to the potential danger of insufficient griping of the sleeve-nut 45.

So as to prevent the sleeve-nut 45 from unscrewing in an untimely way after it has reached a predetermined degree of screwing into the female screwthread 56 of the cylindrical body 1, the sleeve-nut 45 comprises at least one protuberance 59 which, after passing a protuberance 61 of cylindrical body 1, engages in a recess 62 of said cylindrical body. As shown in FIG. 12, the protuberance 59 can be formed for example on the half-nut 45b, in the region of the annular mark 58 of this latter. In this case, the protuberance 61 and the recess 62 can be formed when the first turn of the screw of the female screwthread 56 of the cylindrical body 1, for example on the shell 1a as shown in FIG. 4.

The sealing device which has been described above is suitable to be installed on a cable or a single rigid conduit having an external diameter corresponding to the internal diameter of the sealing gasket 2. However, in the case in which the sealing device is to be installed on a cable or a single conduit of an external diameter substantially smaller than the internal diameter of the sealing gasket 2, or is to be installed on a bundle of cables or conduits, it is generally necessary to provide additional sealing gaskets. In the case of a single cable or conduit of small diameter, it generally suffices to wind on the cable or conduit, in the vicinity on which the sealing device is to be installed, a strip of a resilient material capable of flowing, giving to the strip a number of turns sufficient to reach a diameter about equal to the internal diameter of the sealing gasket 2. After the radial gripping device 3, provided with the sealing gasket 2, has been emplaced about the cable or conduit first provided with said strip, and after the two half-shells 1a and 1b have been disposed about the radial gripping device 3, by assembling and fixing them to each other by means of the bolt 5 and nut 6 assemblies, the mentioned strip is thus subjected already to a first compression if it has been rolled to achieve an external diameter slightly greater than the internal diameter of the sealing gasket 2. Then, after the split collar 44 has been emplaced about the cable or conduit and engaged in the cylindrical body 1, and the two half-shells 45a and 45b have been also disposed about the cable or conduit and secured to each other as described above, and after the sleeve-nut 45 has been completely screwed into the female screwthread 56 of the cylindrical body 1, the sealing gasket 2 and the mentioned strip are strongly compressed entirely about the cable or conduit so as to ensure both the desired sealing and an immobilization of the cable or conduit in the cylindrical body 1. The screwing of the sleeve-nut 45 can be carried out before or after the securement flange 15 has been secured to the partition through the hole of which the cable or conduit passes.

Figure 14:
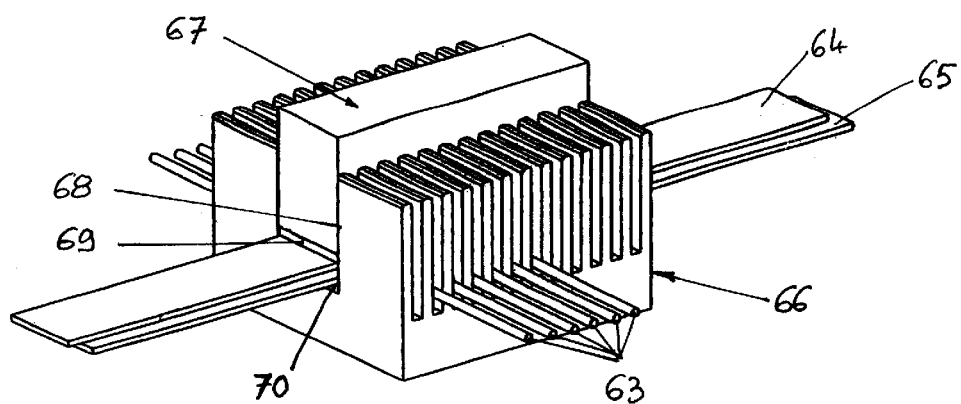
FIG. 14 is a perspective view showing a device for the preparation of a bundle of cables in the form of a layer of cables.
Figure 15:
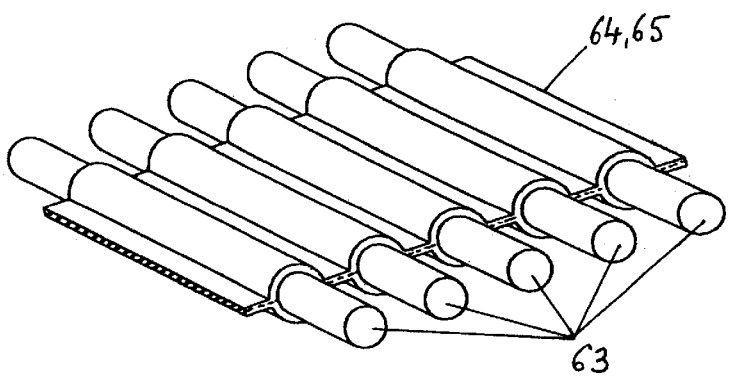
FIG. 15 is a perspective view showing, on a larger scale, a layer of cables obtained with the help of the device of FIG. 14.

In the case in which the sealing device is to be installed on a bundle of cables 63, for example electrical cables, there can be provided as an additional sealing gasket, in addition to the sealing gasket 2, at least one pair of strips 64 and 65 of elastomeric material (FIGS. 14 and 15). The two strips 64 and 65 can be placed in sandwich fashion and pressed on each side of a layer comprised by at least one portion of the cables 63 forming the bundle of cables, with the help of the device shown in FIG. 14. This device comprises essentially a matrix 66, which overall has the shape of a comb with large teeth, and a presser 67. The matrix 66 comprises a number of teeth, hence a number of inter-tooth spaces, at least equal to the number of cables 63 comprising the layer of cables which must be gripped in sandwich fashion between the two strips 64 and 65 of elastomeric material. Given that the cables 63 can have different diameters, the inter-tooth spaces have a width a bit greater than the largest diameter of the cable in question. Each tooth of the matrix 66 has substantially in its middle a wide notch 68 whose depth is equal to that of the inter-tooth spaces of the matrix 66 in the form of a comb. The notches 68 are aligned and have a width which corresponds to that of the strips 64 and 65 and to that of the presser 67, this width being itself substantially equal to the axial length of the radial gripping device 3 and of the sealing gasket 2. The lower surface of the presser 67 and the bottom of the notches 68 and the inter-tooth spaces are respectively provided with layers 69 and 70 of elastomeric material having a thickness at least equal to half of the diameter of the cables 63. Thus, when first placing the strips 65 on the layer 70 at the bottom of the notches 68, then the cables 63 in the contiguous inter-tooth spaces of the matrix 66 in the form of a comb, then the strip 64 in the notches 68, transversely over the cables 63, and finally pressing the sandwich thus obtained with the presser 67, there is finally obtained the layered structure shown in FIG. 15. In FIG. 14, there is shown a layer of six cables 63 (FIG. 15 shows only five cables 63 as the layer is cut), but it follows that the device shown in FIG. 14 permits forming layers of cables 63 comprising a greater or lesser number than five or six, the maximum number of cables depending only the total number of inter-tooth spaces of the matrix 66 in the form of a comb. Moreover, in FIGS. 14 and 15, there is shown only the sections of the cable 63, but of course these latter have in practice lengths much greater on each side of the strips 64 and 65.

Figure 16:
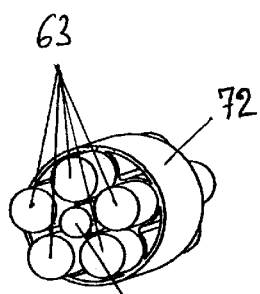
FIG. 16 shows the layer of cables of FIG. 15, rolled up on itself and surrounded by a strip of elastomeric material, before its emplacement in the sealing device according to the invention.

The layer shown in FIG. 15 is then to be rolled about a suitable central core 71, as shown in FIG. 16 (the core 71 can if desired be one of the cables 63 of the layer, in which case the layer is rolled about itself). In the roll thus obtained, a strip 72 of elastomeric material is wound in at least one layer as shown also in FIG. 16, to obtain a diameter at least equal to and preferably slightly greater than the internal diameter of the sealing gasket 2. The strip 72 can be constituted by a certain length of one or the other of the two strips 64 and 65 or both, which has not been detached from the layer shown in FIG. 15 and prolongs the latter. However, the strip 72 can also be constituted by a piece of strip different from the strips 64 and 65 of the layer, but having preferably the same width and made of the same material as the strips 64 and 65.

Figure 17:
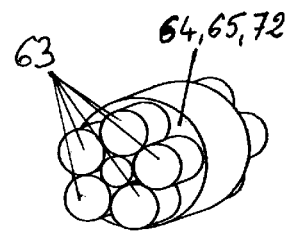
FIG. 17 is a view similar to FIG. 16, showing the bundle of cables after it has been radially compressed in the sealing device according to the invention.

The sealing device according to the invention can be installed on the bundle of cables 63 thus prepared (FIG. 16) in a manner similar to that described above with respect to a single cable or conduit. When the sleeve-nut 45 is screwed to the end, the radial gripping device 3 compresses the various layers of elastomeric material formed by the sealing gasket 2, the strips 64, 65 and 72, such that the elastomeric material flows and fills the empty spaces which can exist about the bundle of cables and between the cables 63 of said bundle, giving a compact and sealed assembly as is shown in FIG. 17.

Figure 18:
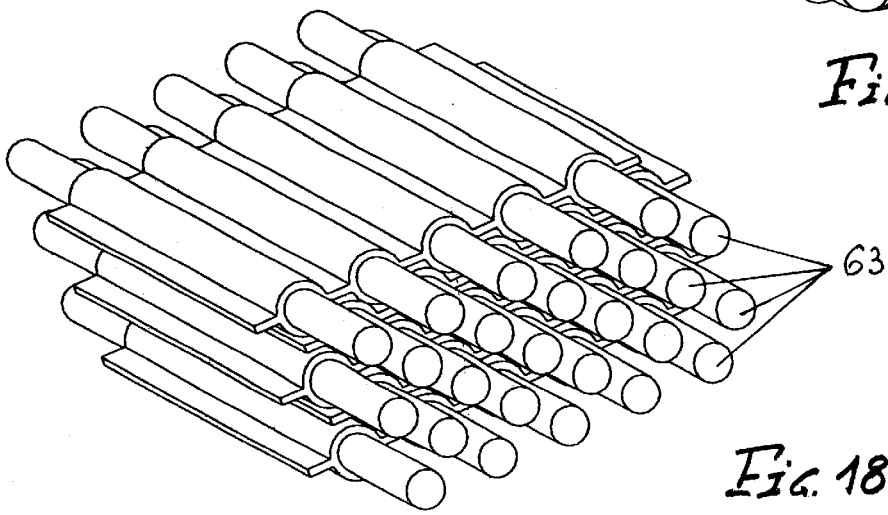
FIG. 18 is a perspective view showing another manner of preparing a bundle of cables comprising a large number of cables, before said bundle is emplaced in the sealing device according to the invention.

In the case in which the bundle of cables comprises a large number of cables 63, for example 25 cables as shown in FIG. 18, or an even greater number of cables, it no longer becomes practically possible to provide a layer comprising such a large number of cables with an apparatus similar to that of FIG. 14 and to wind such a layer on itself, if it is considered that at the time this layer must be formed, the number of cables has already passed through the whole of the partition and generally can no longer be removed. In this case, a solution can consist in superposing several layers of cable similar to that shown in FIG. 15, so as to obtain stackless layers similar to that which is shown in FIG. 18. Preferably, there are stacked up a number of layers such that there is obtained, seen in cross-section in a plane perpendicular to the longitudinal axis of the cables 63, a stack having a contour circumscribing in a square or in a regular polygon (in this latter case the layers can comprise different numbers of cables 63). Then, a strip of elastomeric material can be placed about the stack in a manner similar to that described with reference to FIG. 16.

It will be noted that the sealing device according to the invention which has been described above is adapted to be repaired if there is a leak. Thus, in this case, it suffices to unscrew the sleeve-nut 45, to unscrew the bolts 5 to be able to space apart the two half-shells 1a and 1b and to slide the split collar 44 and the sleeve-nut 45 along the bundle of cables, and to remove the radial gripping device 3 with its sealing gasket 2 to be able to inspect this latter and if necessary replace it in case of a leak. In the case of a bundle of cables prepared as shown in FIGS. 16 or 18, if there is no empty space between the cables of the bundles, there can be added one or several supplemental turns of a strip 72 about the bundle before reinstalling the sealing device about the bundle of cables. On the other hand, if empty spaces are found between the cables of the bundle, in the case of a single layer, the latter can be unrolled and reformed by placing on it supplemental thicknesses of strips of elastomeric material. In the case of multiple superposed layers, the layers can be separated and individually reformed as indicated above with respect to a single layer, or supplemental strips of elastomeric material can be interposed between the different layers, so as to increase the quantity of elastomeric material located between the cables 63 and available to fill the empty spaces between them when the assembly of layers is compressed by the radial gripping device 3.

Figure 6:
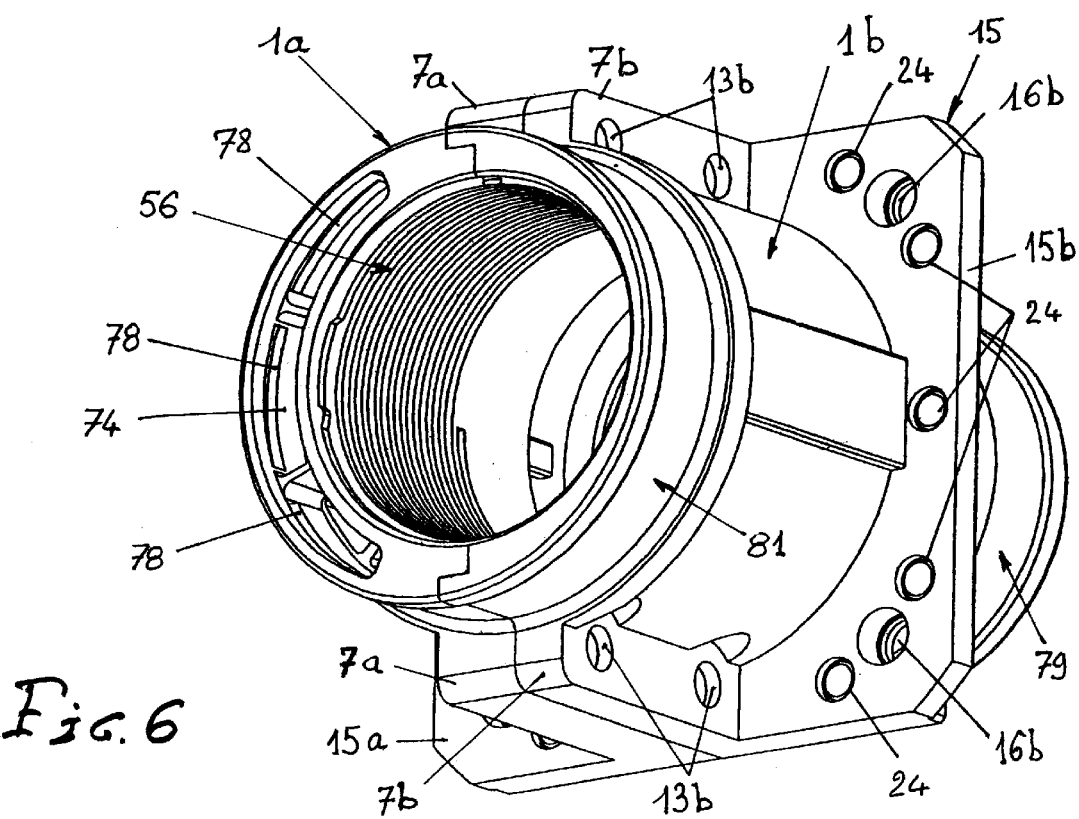
FIG. 6 is a perspective view of the two half-shells assembled to each other.
Figure 8:
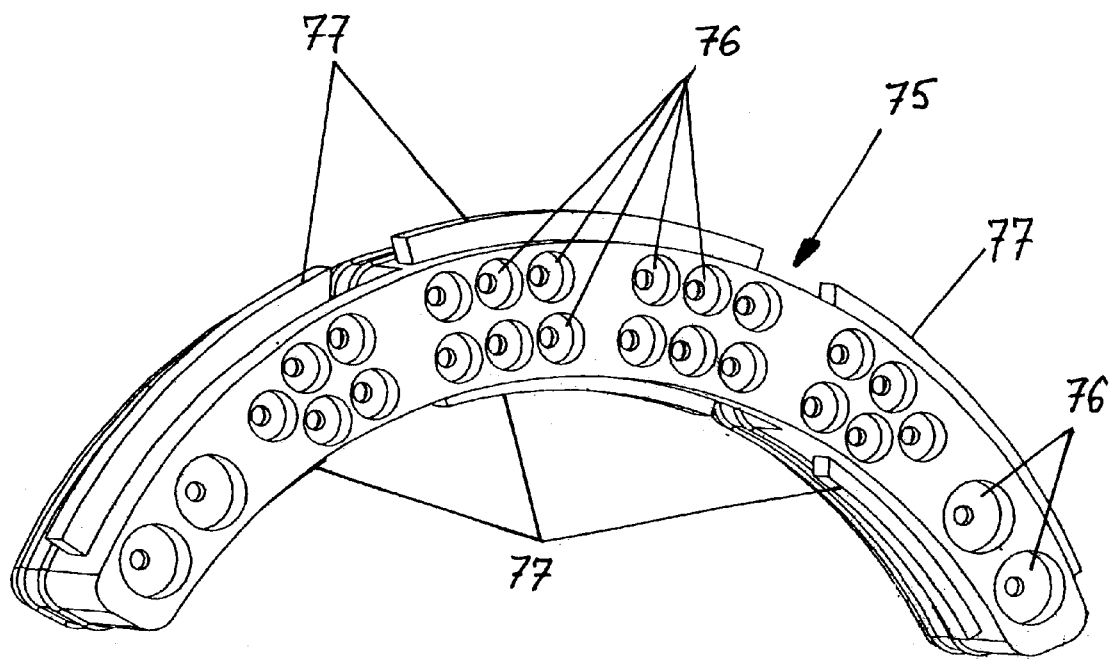
FIG. 8 is a perspective view of a wire grommet adapted to be used with the sealing device according to the invention.

According to another characteristic of the sealing device according to the invention, the latter is so designed that supplemental cables may be passed through the whole of the partition after the sealing device has been installed and a bundle of cables are affixed to said partition. To this end, at least one of the two half-shells 1a and 1b of the cylindrical body 1 comprises, in the thickness of its wall, at least one longitudinal channel, for example six channels 73, as shown in FIG. 3. One of the ends of the channels 73 opens outside the cylindrical body 1 on the side of its screw-threaded end, which is to say on the side of the sleeve-nut 45, through an opening 74 of arched form (FIGS. 4 and 6). This opening 74 can be closed in a sealed manner by a cable grommet 75 (FIGS. 1, 2 and 8) comprising several passages 76 which are preferably dimensioned for cables of different diameters and which are for example distributed in six groups corresponding respectively to the six channels 73, and as is more particularly visible in FIG. 8. The cable grommet 75 is retained with the opening 74 of the cylindrical body 1 by several ribs 77, for example six ribs 77 which are formed of a single piece with the cable grommet. The three external ribs 77 are respectively engaged in an oblong 78 (FIGS. 1, 2 and 6) whilst the three internal ribs 77 are respectively engaged in grooves which are formed in the cylindrical body and of which only one is visible in FIG. 2, but not indicated by a reference numeral.

The other end of the channel 73 opens into the internal space of the cylindrical body 1, which is located around the annular shoulder 22, the channels 73 opening at the base of said annular shoulder as shown in FIG. 2.

In the case in which all the channels 73 are located in one of the two half-shells of the cylindrical body 1, for example the half-shell 1a as shown, it is possible to give to this half-shell 1a a sufficient wall thickness in which to form the channels 73, by forming the two half-shells 1a and 1b such that the internal cylindrical volume of the cylindrical body 1 will be axially offset relative to the external cylindrical surface of said cylindrical body 1.

In the case in which the bundle of cables is surrounded by a braided metallic armoring sleeve, the sleeve must of course be cut off all about the bundle of cables and the two resulting portions of the sleeve must be spaced from each other and rewoven along the bundle of cables, which can be done as described above with respect to FIGS. 14 to 17 or 18. In this case, after the emplacement of the sealing device about the bundle of cables, the continuity of the armoring sleeve must be reestablished. In this case, there is to be used a sealing device whose cylindrical body is at least superficially electrically conductive, and the throats 79 and 81 are provided at the ends of said cylindrical body 1. Under these circumstances, the cut ends of the armoring sleeve can be threaded from above the ends of the cylindrical body 1 at least over a distance corresponding to the width of the circular throats 79 and 81. The ends of the sleeve can then be fixed to the cylindrical body 1 by gripping collars of the "Serreflex", "Band-it", "Tie-rap" type or others which press the ends of the sleeve respectively into the circular throats 79 and 81.

Of course the embodiment of the invention which has been described above has been given by way purely of indicative example and not at all limiting, and numerous modifications may be given thereto by those skilled in the art without thereby departing from the scope of the invention. Thus particularly the collar 44 and the sleeve-nut 45 could be formed of a single piece. More precisely, each half-nut 45a, 45b could be elongated and comprise a conical bevel at its end adjacent the radial gripping device 3. However, this solution is less desirable than that described above to the extent that the sleeve-nut 45, when turning, could, by friction, subject the fingers 33 of the radial gripping device 3 to a tangential force tending to deform them also in the circumferential direction.

Moreover, in the described embodiment, the sleeve-nut 45 is provided with a male screwthread 55 that screws into a female screwthread 56 of the cylindrical body 1. In another embodiment, in which the two half-shells forming the cylindrical body 1 have a constant wall thickness with concentric internal and external cylindrical surfaces, the cylindrical body could be provided with a screwthread over its external cylindrical surface and the nut could be made in the form of a cap nut provided with an internal screwthread which can screw over the external screwthread of the cylindrical body. In this case, the collar 44 could have a greater axial length, so as to project beyond the end of the cylindrical body 1, such that, when the cap nut is screwed onto the cylindrical body, it presses the collar 44 axially to act on the fingers 33 of the radial gripping device 3.

What is claimed is:

1. A sealing device to establish a seal between a partition and at least one cable passing through a hole in said partition, said sealing device comprising:
   two half-shells forming a cylindrical body completely surrounding said at least one cable and being secured to said partition at said hole, said cylindrical body having a female screwthread at a first end, and in a region located distant from said female screwthread, an annular internal shoulder;
   a sealing joint between said cylindrical body and said partition; and
   sealing means for filling a space between said at least one cable and said cylindrical body and immobilizing said at least one cable and said cylindrical body relative to each other, said sealing means comprising at least one flowable elastic sealing gasket surrounding said at least one cable;
   a radial gripping device comprising an elastically deformable split ring that surrounds said at least one flowable elastic sealing gasket and engages said cylindrical body in axial abutment against the annular internal shoulder of said cylindrical body, said elastically deformable split ring having a radially retractable skirt that is radially retractable in a substantially uniform manner about a circumference of the radially retractable skirt under an influence of an axial gripping force; and
   an axial gripping device exerting the axial gripping force, said axial gripping device comprising a resiliently deformable split collar that slides axially in said cylindrical body and has a central hole with a conical surface facing toward a free end of the radially retractable skirt, and two half-nuts forming an externally screwthreaded sleeve-nut that surrounds said at least one cable, is screwed into the female screwthread of said cylindrical body, and presses axially against said split collar, said conical surface pressing against the free end of the radially retractable skirt to force said radially retractable skirt to radially retract, so as to compress, and cause said sealing gasket to flow to fill said space between said at least one cable and said cylindrical body.

2. The sealing device according to claim 1, wherein said radially retractable skirt comprises a circular series of flexible fingers that are integrally formed with said elastically deformable split ring and that extend from an end face of said elastically deformable split ring in a direction substantially parallel to an axis of said elastically deformable split ring.

3. The sealing device according to claim 2, wherein a lateral surface of each of said flexible fingers is facing each other two by two, said flexible fingers overlapping in a circumferential direction of said elastically deformable split ring.

4. The sealing device according to claim 2, wherein said externally screwthreaded sleeve-nut of said axial gripping device axially presses the conical surface of said resiliently deformable split collar against a free end of each of said flexible fingers, so as to force each of said free end of said flexible fingers to radially retract.

5. The sealing device according to claim 2, wherein said at least one elastically flowable sealing gasket comprises a longitudinally slotted elastomeric sleeve that covers an internal surface of said elastically deformable split ring, including said flexible fingers, said longitudinally slotted elastomeric sleeve has a first end having a collar that covers a face of said elastically deformable split ring oriented toward the internal annular shoulder of said cylindrical body and an adjacent portion of an external peripheral surface of said elastically deformable split ring.

6. The sealing device according to claim 5, wherein for a bundle of said at least one cable, said sealing gasket further comprises at least one pair of elastomeric strips that sandwich each side of a layer comprising a plurality of cables of said bundle.

7. The sealing device according to claim 6, wherein each of the plurality of cables are in a single layer, comprising said layer and said at least one pair of elastomeric strips, said single layer being rolled into a roll having an axis that is parallel to a longitudinal axis of the plurality of cables, an additional strip of elastomeric material is wound in at least one turn about said roll.

8. The sealing device according to claim 6, wherein the plurality of cables are in a plurality of layers, each said plurality of layers having a predetermined number of the plurality of cables, and each said plurality of layers being sandwiched between a respective pair of strips of elastomeric material, respective ones of said plurality of layers being superposed on each other to form an assembly, and an additional strip of elastomeric material being wound in at least one turn about the assembly.

9. The sealing device according to claim 1, wherein said resiliently deformable split collar comprises a groove parallel to a slot, said groove being diametrically opposite said slot, said groove defining a zone of lesser wall thickness to facilitate resilient deformation of said resiliently deformable split collar about said at least one cable.

10. The sealing device according to claim 1, wherein the two half-nuts comprise respective male and female positioning elements engaging each other, and grip retaining means.

11. The sealing device according to claim 1, wherein said externally screwthreaded sleeve-nut comprises a mark on a peripheral surface thereof that indicates whether said externally screwthreaded sleeve-nut is sufficiently screwed into the female screwthread of said cylindrical body.

12. The sealing device according to claim 11, wherein said mark is a colored ring having a color different from that of said externally screwthreaded sleeve-nut.

13. The sealing device according to claim 1, wherein said externally screwthreaded sleeve-nut and said cylindrical body, respectively, comprise, as anti-unscrewing device, at least one protuberance and at least one recess that engage each other, when said externally screwthreaded sleeve-nut has reached a predetermined screwing degree.

14. The sealing device according to claim 1, wherein said cylindrical body and said elastically deformable split ring, respectively, comprise at least one protuberance and at least one recess engaging each other as an antirotation device.

15. The sealing device according to claim 1, wherein the two half-shells have mutually contacting surfaces having male and female positioning elements, and are connected to each other by bolt-nut assemblies.

16. The sealing device according to claim 15, wherein the two half-shells each further comprises a recess having integral retaining elements, bolts and nuts of said bolt-nut assemblies being in each respective recess and retained by said retaining elements.

17. The sealing device according to of claim 1, wherein each of the two half-shells comprise a half-flange, when the two half-shells are assembled, one of the half-flanges of one of the two half-shells forms with another half-flange of another one of the two half-shells a flange for securing said cylindrical body to said partition.

18. The sealing device according to claim 17, wherein the two half-flanges and the annular shoulder of said cylindrical body are coplanar.

19. The sealing device according to claim 18, wherein said sealing joint comprises two elastomeric half-joints, each half-joint corresponding with a respective half-flange of a corresponding half-shell, each half-joint comprising a substantially flat arch-shaped portion having feet, said substantially flat arch-shaped portion being applied against a surface on a partition side of the half-flange of the corresponding half-shell, a portion of the respective feet of the substantially flat arch-shaped portion being interposed between the two half-flanges and between the corresponding portions of the half-shells.

20. The sealing device according to claim 19, wherein the substantially flat arch-shaped portion of each half-joint has, on a face facing the half-flange of the corresponding half-shell, a plurality of buttons that are snap-fitted into button holes in the half-flange of said corresponding half-shell, for fixing the half-joint to the corresponding half-flange.

21. The sealing device according to claim 1, wherein at least one of the two half-shells comprises at least one longitudinal channel in a wall thereof having a first end that opens outside said cylindrical body on said first end of said cylindrical body and is sealable closed by an elastomeric cable grommet, and a second end that opens into an internal space of said cylindrical body beyond said annular internal shoulder.

22. The sealing device according to claim 1, wherein said cylindrical body is, at least superficially, electrically conductive and further comprises a circular groove for securing a first end of a metallic braid for armoring the at least one cable with a gripping collar, at said first end and a second end.

* * * * *